(12) United States Patent
Tsukada

(10) Patent No.: US 11,097,725 B2
(45) Date of Patent: Aug. 24, 2021

(54) VEHICLE CONTROL DEVICE

(71) Applicant: HONDA MOTOR CO., LTD., Tokyo (JP)

(72) Inventor: Takemi Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 16/336,587

(22) PCT Filed: Sep. 27, 2016

(86) PCT No.: PCT/JP2016/078407
§ 371 (c)(1),
(2) Date: Mar. 26, 2019

(87) PCT Pub. No.: WO2018/061079
PCT Pub. Date: Apr. 5, 2018

(65) Prior Publication Data
US 2019/0225217 A1    Jul. 25, 2019

(51) Int. Cl.
*B60W 30/10* (2006.01)
*G08G 1/16* (2006.01)
*B60W 50/14* (2020.01)

(52) U.S. Cl.
CPC ............ *B60W 30/10* (2013.01); *B60W 50/14* (2013.01); *G08G 1/16* (2013.01); *B60W 2554/00* (2020.02)

(58) Field of Classification Search
CPC .. B60W 30/10; B60W 50/14; B60W 2554/00; G08G 1/16
USPC ....................................................... 701/301
See application file for complete search history.

(56) References Cited

U.S. PATENT DOCUMENTS

| | | | |
|---|---|---|---|
| 8,352,112 B2 * | 1/2013 | Mudalige | G08G 1/164 |
| | | | 701/24 |
| 2009/0174540 A1 * | 7/2009 | Smith | B60Q 1/34 |
| | | | 340/465 |
| 2010/0256852 A1 * | 10/2010 | Mudalige | G08G 1/22 |
| | | | 701/24 |
| 2017/0197635 A1 | 7/2017 | Sato | |

FOREIGN PATENT DOCUMENTS

| | | |
|---|---|---|
| JP | 2008-299666 A | 12/2008 |
| JP | 2014-106854 A | 6/2014 |
| JP | 2016-050900 A | 4/2016 |

OTHER PUBLICATIONS

PCT/ISA/210 from International Application PCT/JP2016/078407 and the English translation thereof.

* cited by examiner

Primary Examiner — Gertrude Arthur Jeanglaude
(74) Attorney, Agent, or Firm — Carrier Blackman & Associates, P.C.; Joseph P. Carrier; Jeffrey T. Gedeon

(57) ABSTRACT

A vehicle control device causes a vehicle to autonomously travel, and, if at least one of one or more predetermined conditions is met, then requests the driver to perform manual driving. The vehicle control device is provided with a condition determination unit and a deceleration selection unit. The condition determination unit determines whether or not said one or more predetermined conditions are met. The deceleration selection unit then selects whether or not to decelerate the vehicle when requesting the driver to perform said manual driving, on the basis of met predetermined conditions (if any).

8 Claims, 13 Drawing Sheets

VEHICLE CONTROL DEVICE

TECHNICAL FIELD

The present invention relates to a vehicle control apparatus (vehicle control device) that demands manual driving of a driver while a vehicle is traveling by automated driving and controls the acceleration/deceleration, steering, and braking of the vehicle.

BACKGROUND ART

Japanese Laid-Open Patent Publication No. 2016-050900 discloses an automated driving assistance system that performs a takeover to manual driving by the driver when encountering a situation where automated driving is difficult during the automated driving of the vehicle. As specific examples of situations where automated driving is difficult, it shows a situation where a right or left turn is made at an intersection, a situation where a lane change or merging needs to be done in a short distance, and bad weather conditions. In the automated driving assistance system, when a vehicle traveling by automated driving has approached an intersection at which it is going to make a right/left turn, a guidance to prompt manual driving is output to the driver from the vehicle side. Further, if the driver will not take over the driving and when there is a route that can be traveled by continuing along the road, the system makes the vehicle travel along the route by automated driving. On the other hand, when there is no route that can be traveled by continuing along the road, the system brings the vehicle into an emergency stop.

SUMMARY OF INVENTION

The automated driving assistance system described in Japanese Laid-Open Patent Publication No. 2016-050900 does not consider how the velocity of the vehicle is controlled when it prompts the driver to perform manual driving.

The present invention was made in view of such a problem, and an object thereof is to provide a vehicle control apparatus that is capable of appropriately controlling the velocity of a vehicle when demanding manual driving of the driver.

Solution to Problem

A first aspect of the present invention is a vehicle control apparatus that makes a vehicle travel by automated driving and demands manual driving of a driver when at least one of one or more predetermined conditions holds, the vehicle control apparatus includes: a condition determination unit configured to determine whether any of the predetermined conditions holds or not; and a deceleration selection unit configured to select whether to decelerate the vehicle or not at a time of demanding manual driving based on one or more of the predetermined conditions that hold. In the first aspect, the velocity can be appropriately controlled at the time of demanding manual driving of the driver in accordance with the cause of the demand for manual driving.

The vehicle control apparatus according to the first aspect may include: a route recognition unit configured to recognize a planned travel route of the vehicle; and a host vehicle recognition unit configured to recognize a current position of the vehicle, wherein the condition determination unit may be configured to determine that at least one of the predetermined conditions holds when a node that involves a course change or a change in a direction of travel is included in the planned travel route within a predetermined distance from the current position, and the deceleration selection unit may be configured to select not to decelerate the vehicle when the node is included in the planned travel route within the predetermined distance from the current position. It is difficult to continue automated driving at a node that involves a course change or a change in the direction of travel, such as a right/left turn point, a merging point, or a branching point. Thus, the driving should be taken over to the driver when the vehicle is expected to travel through a right/left turn point, a merging point, or a branching point during automated driving. It is possible, however, that the driver does not take over the driving intentionally or out of necessity. In such a case, if a road that can be traveled is present ahead of the right/left turn point, the merging point, or the branching point, the vehicle may continue to travel forward through the right/left turn point, merging point, or branching point and be subsequently rerouted. The first aspect allows the vehicle to pass through without deceleration when the vehicle continues to travel forward through a right/left turn point, a merging point, or a branching point without changing the course or direction of travel there. This can prevent stagnation of a traffic flow due to deceleration of the vehicle.

The vehicle control apparatus according to the first aspect may include: a route recognition unit configured to recognize a planned travel route of the vehicle; and a host vehicle recognition unit configured to recognize a current position of the vehicle, wherein the condition determination unit may be configured to determine that at least one of the predetermined conditions holds when there is no road extending forward on the planned travel route within a predetermined distance from the current position, and the deceleration selection unit may be configured to select to decelerate the vehicle when there is no road extending forward on the planned travel route within the predetermined distance from the current position. In the first aspect, the vehicle is decelerated beforehand in a scene that would require stopping of the vehicle if the driver will not take over the driving. Thus, the vehicle can be stopped promptly even if the driver does not take over the driving.

The vehicle control apparatus according to the first aspect may include: a route recognition unit configured to recognize a planned travel route of the vehicle; a host vehicle recognition unit configured to recognize a current position of the vehicle; and a signal prediction unit configured to predict a signal of a traffic light on the planned travel route at a time when the vehicle traveling by automated driving reaches the traffic light, wherein the condition determination unit may be configured to determine that at least one of the predetermined conditions holds when a node that involves a course change or a change in a direction of travel is included in the planned travel route within a predetermined distance from the current position and when a stop commanding signal is predicted for the traffic light at the node by the signal prediction unit, and the deceleration selection unit may be configured to select to decelerate the vehicle when the node is included in the planned travel route within the predetermined distance from the current position and when a stop commanding signal is predicted for the traffic light at the node by the signal prediction unit. In the first aspect, the vehicle is decelerated beforehand in a scene that would require stopping of the vehicle if the driver will not take over the driving. Thus, the vehicle can be stopped promptly even if the driver does not take over the driving.

The vehicle control apparatus according to the first aspect may include at least one of an outside world recognition unit configured to recognize an outside world and a fault detection unit configured to detect a fault in an instrument used in automated driving, wherein the condition determination unit may be configured to determine that at least one of the predetermined conditions holds when the outside world recognition unit is unable to recognize a part or a whole of the outside world, and/or when the fault in the instrument is detected by the fault detection unit, and the deceleration selection unit may be configured to select to decelerate the vehicle when the outside world recognition unit is unable to recognize a part or a whole of the outside world, and/or when a fault in the instrument is detected by the fault detection unit. In the first aspect, the vehicle is decelerated beforehand in a scene that would require stopping of the vehicle if the driver will not take over the driving. Thus, the vehicle can be stopped promptly even if the driver does not take over the driving.

A second aspect of the present invention is a vehicle control apparatus that decelerates a vehicle at a time of demanding manual driving of a driver during automated driving, and the vehicle is not decelerated in a case of demanding manual driving of the driver when a right or left turn is made at an intersection. The second aspect allows the vehicle to pass through without deceleration when the vehicle continues to travel forward through an intersection at which it has been planned to make a right or left turn. This can prevent stagnation of a traffic flow due to deceleration of the vehicle.

DESCRIPTION OF EMBODIMENTS

A vehicle control apparatus according to the present invention is described in detail below by showing preferred embodiments with reference to the accompanying drawings.

1 Configuration of Automated Driving Vehicle 10

Figure 1:
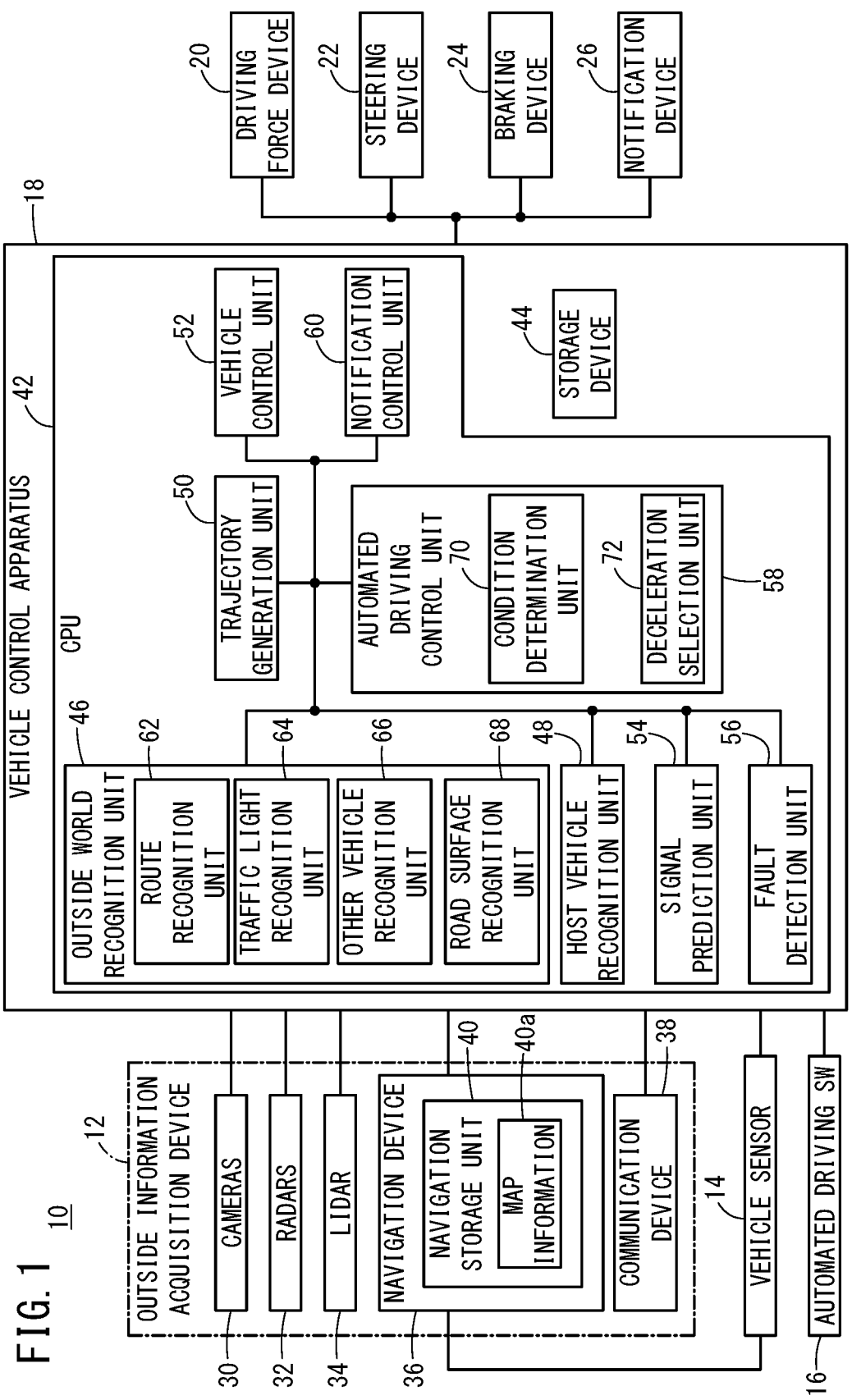
FIG. 1 shows a configuration of a vehicle equipped with a vehicle control apparatus according to an embodiment of the present invention.

As shown in FIG. 1, a vehicle control apparatus 18 according to an embodiment of the present invention is provided on an automated driving vehicle 10 (also called "vehicle 10" hereinbelow). The vehicle 10 includes an outside information acquisition device 12, a vehicle sensor 14, an automated driving switch 16 (also called "automated driving SW 16" hereinbelow), the vehicle control apparatus 18, a driving force device 20, a steering device 22, a braking device 24, and a notification device 26.

The outside information acquisition device 12 has a plurality of cameras 30, a plurality of radars 32, a plurality of LIDARs 34, a navigation device 36, and a communication device 38. The cameras 30 take images of the surroundings of the vehicle 10 to obtain image information. The radars 32 emit electromagnetic waves to the surroundings of the vehicle 10 and detect reflected waves for the emitted electromagnetic waves. The LIDARs 34 emit laser to the surroundings of the vehicle 10 and detect scattered light for the emitted laser. A fusion sensor for fusing the image information obtained by the cameras 30 and detection information obtained by the radars 32 may also be used.

The navigation device 36 has a navigation storage unit 40 to store map information 40a. The map information 40a includes, for example, road geometry information, information on nodes such as intersections, merging points, and branching points, information on the presence/absence of traffic lights, and position information of stop lines. The navigation device 36 measures the current position of the vehicle 10 (the position being traveled) using detection information from a satellite positioning device, the vehicle sensor 14, and the like, and generates a planned travel route from the position to the destination specified by a user. The navigation device 36 has operation switches (including a touch panel), a display, and a speaker as user interfaces, and displays the generated planned travel route and provides audio guidance on the planned travel route.

The communication device 38 is capable of communicating with other communication devices provided in roadside equipment, other vehicles, servers, or the like. The communication device 38 sends and receives traffic information, information relating to other vehicles, probe information, updated map information, and the like. Traffic information includes information on change in traffic light signals over time.

The vehicle sensor 14 includes a plurality of sensors for detecting various behaviors of the vehicle 10. For example, the vehicle sensor 14 includes a velocity sensor for detecting a velocity (vehicle velocity) V of the vehicle 10, an acceleration sensor for detecting an acceleration/deceleration A of the vehicle 10, a lateral G sensor for detecting a lateral acceleration G of the vehicle 10, a yaw rate sensor for detecting a yaw rate Y of the vehicle 10, an orientation sensor for detecting the orientation of the vehicle 10, an inclination sensor for detecting the inclination of the vehicle 10, and the like.

The vehicle sensor 14 also includes operation detection sensors for detecting whether operation devices (such as an acceleration pedal, steering wheel, brake pedal, shift lever, and direction indicator lever) are being operated or not, the amount of operation, and the position of operation. For example, the vehicle sensor 14 includes an acceleration pedal sensor for detecting the amount of accelerator pressing (opening), a steering angle sensor for detecting the amount of operation of the steering wheel (steering angle θs), a torque sensor for detecting a steering torque Tr, a brake pedal sensor for detecting the amount of brake pressing, a shift sensor for detecting the shift position, and the like.

The automated driving SW 16 has a start SW and a stop SW. The start SW outputs a start signal to the vehicle control apparatus 18 in response to an operation by the user. The stop SW outputs a stop signal to the vehicle control apparatus 18 in response to an operation by the user.

The vehicle control apparatus 18 is composed of one or more ECUs and includes a CPU 42, a storage device 44, and the like. In this embodiment, functional components 46, 48, 50, 52, 54, 56, 58, 60 are implemented by the execution of programs stored in the storage device 44 by the CPU 42. The functional components 46, 48, 50, 52, 54, 56, 58, 60 may also be implemented by hardware consisting of an integrated circuit and the like.

The driving force device 20 has a driving force ECU and a driving source for the vehicle 10 such as an engine and/or a traction motor. The driving force device 20 generates travel driving force (torque) for the traveling of the vehicle 10 in accordance with a control command output by a vehicle control unit 52 (see FIG. 1), and transmits it to the wheels via a transmission or directly.

The steering device 22 includes an electric power steering system (EPS) ECU and an EPS device. The steering device 22 changes the orientation of the wheels (drive wheels) in accordance with a control command output by the vehicle control unit 52 (see FIG. 1).

The braking device 24 is an electric servo brake used in conjunction with a hydraulic brake, for example, and has a brake ECU and a brake actuator. The braking device 24 brakes the wheels in accordance with a control command output by the vehicle control unit 52 (see FIG. 1).

The vehicle 10 may also be steered by changing the distribution of torque and/or the distribution of braking force between the right and left wheels.

The notification device 26 has a notification ECU and a display device and/or an audio device. The notification device 26 provides notification, such as a demand for manual driving or a procedure to start automated driving, in accordance with a notification command output by a notification control unit 60. Performing a manual operation by the driver during automated driving is called a handover (H/O). A demand for manual driving is also called an H/O request.

2 Configuration of Vehicle Control Apparatus 18

As mentioned above, the vehicle control apparatus 18 has the CPU 42 and the storage device 44. The CPU 42 functions as an outside world recognition unit 46, a host vehicle recognition unit 48, a trajectory generation unit 50, the vehicle control unit 52, a signal prediction unit 54, a fault detection unit 56, an automated driving control unit 58, and the notification control unit 60.

The outside world recognition unit 46 recognizes target objects in the outside world based on various kinds of information obtained by the outside information acquisition device 12 and recognizes their positions. The outside world recognition unit 46 is further composed of a route recognition unit 62, a traffic light recognition unit 64, an other vehicle recognition unit 66, and a road surface recognition unit 68.

The route recognition unit 62 recognizes a planned travel route (a planned travel route generated by the navigation device 36 or a planned travel route along the road) based on the map information 40*a* from the navigation device 36. The traffic light recognition unit 64 recognizes the presence or absence of a traffic light ahead of the vehicle 10 based on at least one of an image processing result for image information from the cameras 30, the map information 40*a* from the navigation device 36, and traffic light information received by the communication device 38. The other vehicle recognition unit 66 recognizes a vehicle ahead that is present in front of the vehicle 10 as well as an inter-vehicle distance D between the vehicle 10 and the vehicle ahead based on at least one of an image processing result for image information from the cameras 30, a detection result from the radars 32, and a detection result from the LIDARs 34. The road surface recognition unit 68 recognizes lane markings present on the opposite sides of the vehicle 10 and a stop line or the like present ahead of the vehicle 10 based on at least one of an image processing result for image information from the cameras 30 and a detection result from the LIDARs 34.

The host vehicle recognition unit 48 recognizes the behavior of the vehicle 10 based on detection values from the vehicle sensor 14. The host vehicle recognition unit 48 also recognizes the current position and attitude of the vehicle 10 based on the position information of the vehicle 10 measured by the navigation device 36 and the sensor information detected by the vehicle sensor 14. Instead, without using the navigation device 36, the current position of the vehicle 10 may be measured using detection information from a satellite positioning device, the vehicle sensor 14, or the like, and the current position and attitude of the vehicle 10 may be recognized. The host vehicle recognition unit 48 also recognizes the position of the vehicle 10 in the vehicle width direction based on the positions of the lane markings recognized by the road surface recognition unit 68.

The trajectory generation unit 50 generates a target travel trajectory and a target velocity for the vehicle 10 based on a recognition result from the outside world recognition unit 46 and a recognition result from the host vehicle recognition unit 48 in order to make the vehicle 10 travel along a planned travel route (a planned travel route generated by the navigation device 36 or a planned travel route along the road). When generating a target travel trajectory for driving straight, an approximate center between the lane markings on the opposite sides recognized by the road surface recognition unit 68 is defined as a target position.

The vehicle control unit 52 outputs control commands to the driving force device 20, the steering device 22, and the braking device 24. During automated driving, the vehicle control unit 52 outputs control commands so as to make the vehicle 10 travel at the target velocity along the target travel trajectory generated by the trajectory generation unit 50. During manual driving, the vehicle control unit 52 outputs control commands based on detection results from the operation detection sensors included in the vehicle sensor 14.

The signal prediction unit 54 predicts the signal of a traffic light 92 (see FIG. 4, for instance) installed on the planned travel route ahead of the vehicle 10. In prediction, the signal prediction unit 54 calculates the time of arrival at the traffic light 92 using the distance from the current position of the vehicle 10 to the traffic light 92 and the vehicle velocity V, and predicts the signal at the time of arrival based on the traffic information obtained by the communication device.

The fault detection unit 56 detects any fault in instruments used in automated driving, for example, instruments included in the outside information acquisition device 12, the vehicle sensor 14, the driving force device 20, the steering device 22, the braking device 24, the notification device 26, and the like. The fault detection unit 56 monitors diagnostic trouble code (DTC), for example.

The automated driving control unit 58 centrally controls automated driving, controlling the start and stop of automated driving. The automated driving control unit 58 starts automated driving in response to a start signal output by the start SW of the automated driving SW 16 and stops the automated driving in response to a stop signal output by the stop SW. The automated driving control unit 58 also stops the automated driving when any operation device is manually operated during automated driving. Operating the stop SW and manually operating any operation device by the driver during automated driving is called an override.

The automated driving control unit 58 further controls the output of an H/O request and has a condition determination unit 70 and a deceleration selection unit 72. The condition determination unit 70 determines whether predetermined conditions for outputting an H/O request hold or not. As the predetermined conditions, situations when a target travel trajectory cannot be generated by the trajectory generation unit 50 are specified. For example, as one of the predetermined conditions, a situation where a node that involves a course change or a change in the direction of travel is included in the planned travel route within a first predetermined distance Dth1 from the current position is specified (a first condition). A node that involves a course change or a change in the direction of travel refers to a right/left turn point, a merging point, or a branching point, for example. Hereinbelow, a node that involves a course change or a change in the direction of travel may be called just a right/left turn point or the like. As one of the predetermined conditions, a situation where there is no road extending forward at a right/left turn point or the like on the planned travel route within the first predetermined distance Dth1 from the current position is specified (a second condition). As one of the predetermined conditions, a situation where a stop commanding signal is predicted for the traffic light 92 at a right/left turn point or the like present on the planned travel route within the first predetermined distance Dth1 from the current position is specified (a third condition). As one of the predetermined conditions, a situation where the outside world recognition unit 46 is unable to recognize a part or the whole of the outside world is specified (a fourth condition). As one of the predetermined conditions, a situation where a fault in instruments such as the outside information acquisition device 12 and the vehicle sensor 14 is detected is specified (a fifth condition). As one of the predetermined conditions, a situation where the number of times rerouting is performed by the navigation device 36 has reached or exceeded a threshold is specified (a sixth condition). The second to sixth conditions are also conditions that require deceleration of the vehicle 10. The deceleration selection unit 72 selects whether to decelerate the vehicle 10 or not based on a predetermined condition that is determined to hold by the condition determination unit 70, and instructs the vehicle control unit 52 to output a control command.

The notification control unit 60 outputs a notification command for an H/O request to the notification device 26 when any of the predetermined conditions holds.

The storage device 44 stores various programs and various predetermined values (such as first to third predetermined distances Dth1 to Dth3). The storage device 44 also stores the predetermined conditions (the first to sixth conditions) for determination by the condition determination unit 70 of the automated driving control unit 58.

3 Request Process

While the vehicle 10 is traveling, the vehicle control apparatus 18 iteratively executes one or more request processes as discussed below. In this embodiment, first to third request processes are executed in parallel. In each request process, predetermined conditions concerning whether an H/O request is necessary or not are individually determined.

The individual request processes are described below. In the processes described below, it is assumed that inter-vehicle distance maintenance control (deceleration control) is preferentially executed when the inter-vehicle distance between the vehicle 10 and the vehicle ahead has become equal to or less than a distance appropriate for the vehicle velocity V.

3-1 First Request Process

Figure 2:
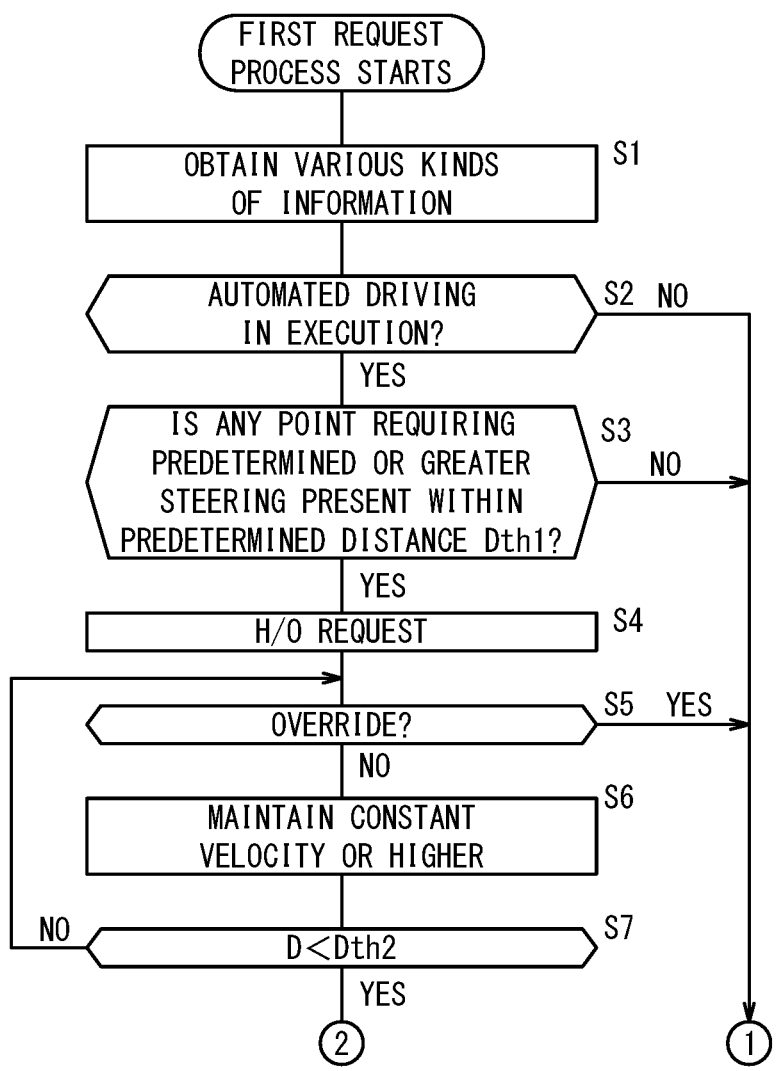
FIG. 2 is a flowchart of a first request process.
Figure 3:
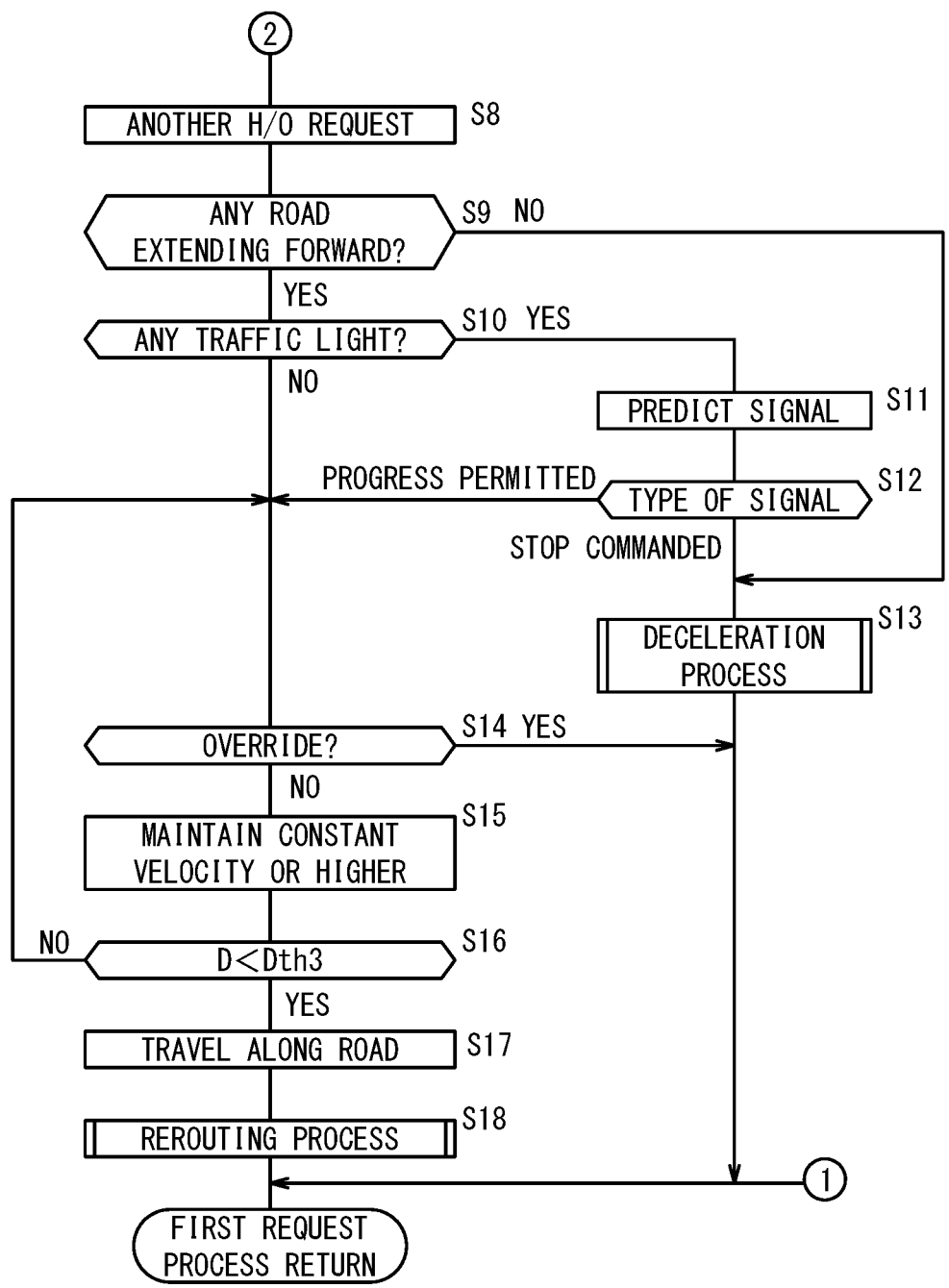
FIG. 3 is a flowchart of the first request process.

Using the flowchart shown in FIGS. 2 and 3, the first request process is described. For the first request process described below, assume that the driver has set a destination on the navigation device 36 and the planned travel route from the current position of the vehicle 10 to the destination has been set.

At step S1, the vehicle control apparatus 18 obtains information detected by the instruments in the outside information acquisition device 12 and the instruments in the vehicle sensor 14. Such information is periodically obtained in the subsequent steps. At step S2, the automated driving control unit 58 determines whether automated driving is currently in execution or not. When automated driving is currently in execution (step S2: YES), the process proceeds to step S3. On the other hand, when automated driving is not currently in execution (step S2: NO), the subsequent steps are not performed and the first request process ends once.

At step S3, the condition determination unit 70 references the map information 40a stored in the navigation device 36 and determines if there is a point that requires a predetermined or greater steering on the planned travel route within the first predetermined distance Dth1 (for example, 700 m) from the current position. For example, it is determined that the predetermined or greater steering is required if a curvature 1/r at a node is equal to a predetermined curvature 1/rth or greater. Alternatively, it is determined that the predetermined or greater steering is required if an angle θ between the entrance and the exit of a node is less than a predetermined angle θth. As specific examples of points with the predetermined curvature 1/rth or greater (or less than the predetermined angle θth), an intersection where a right/left turn is planned, a merging point, a branching point, and a curve are described.

Figure 4:
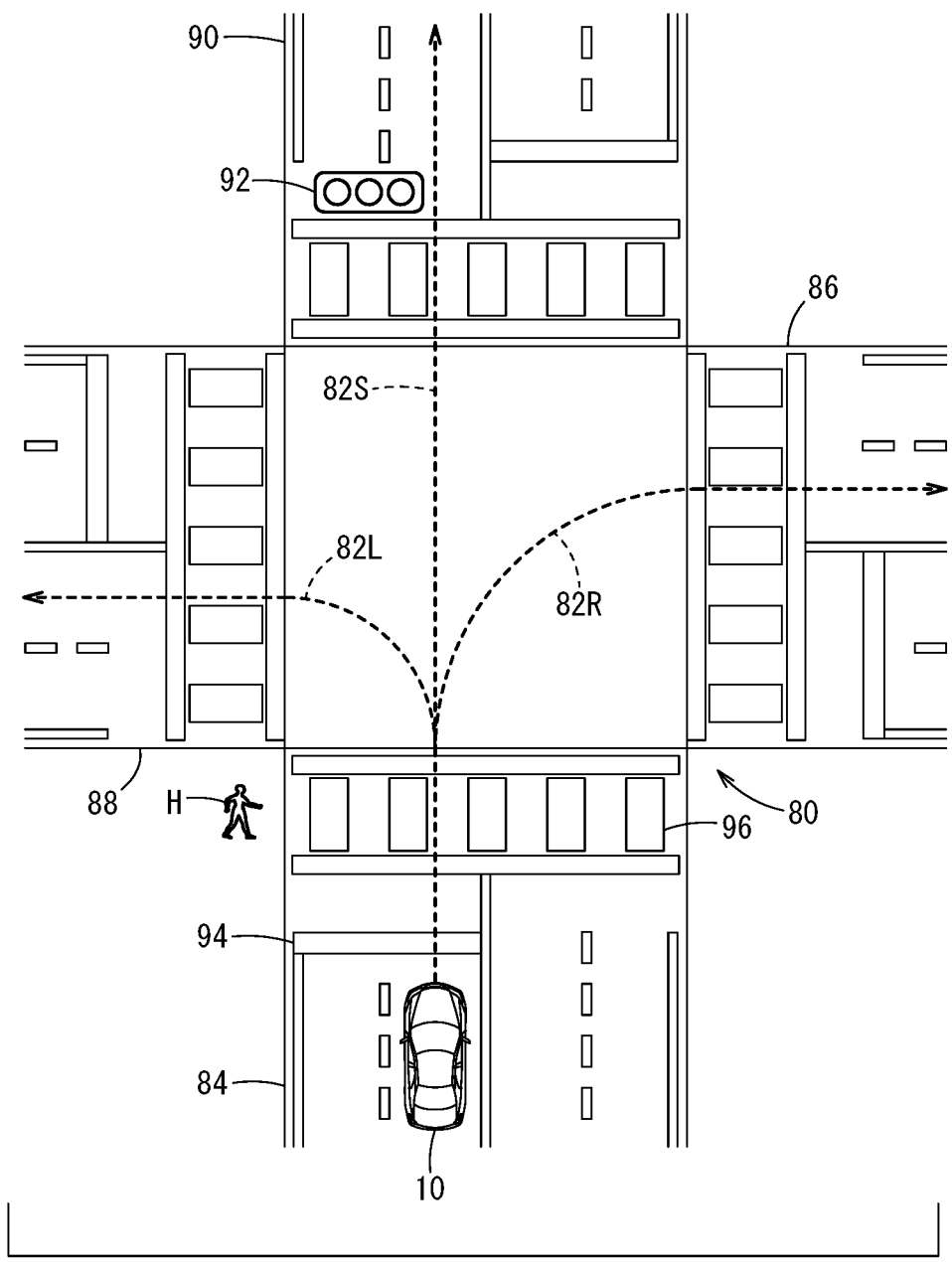
FIG. 4 is an illustration for describing vehicle situation at an intersection.
Figure 5:
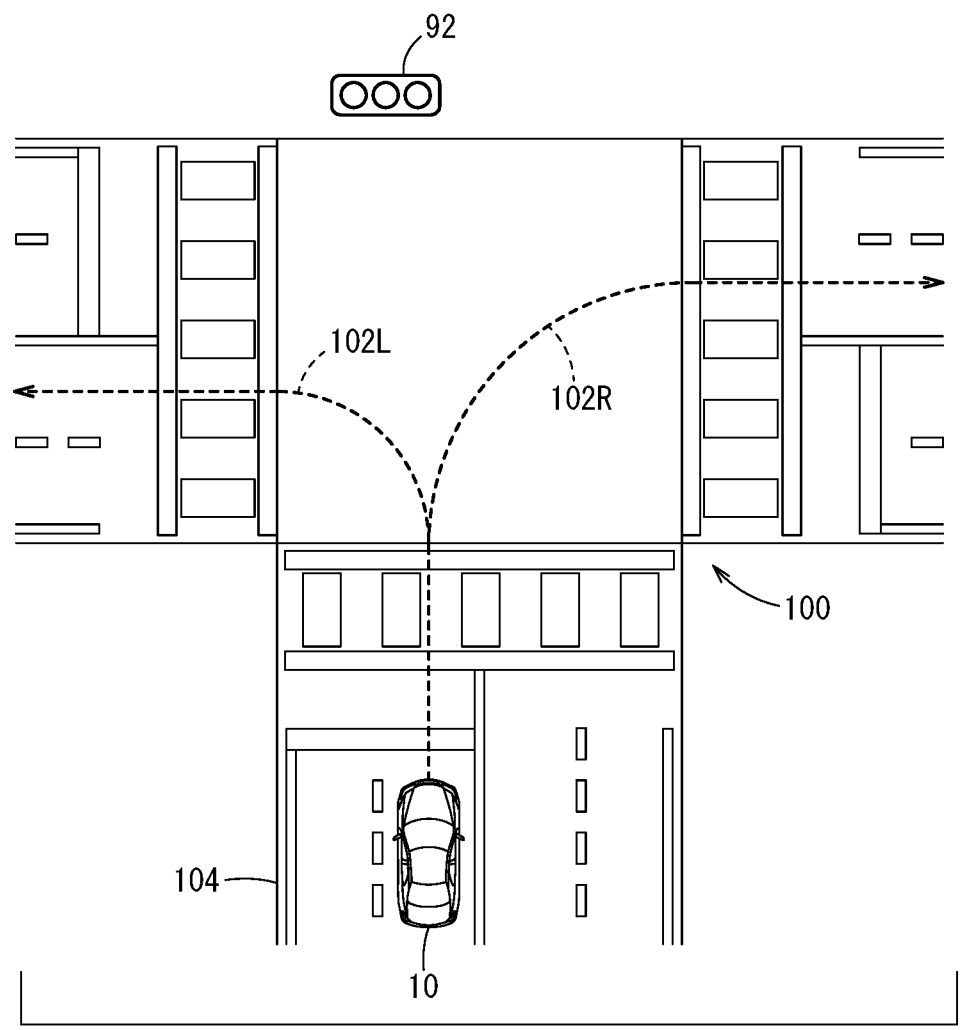
FIG. 5 is an illustration for describing vehicle situation at an intersection.
Figure 6:
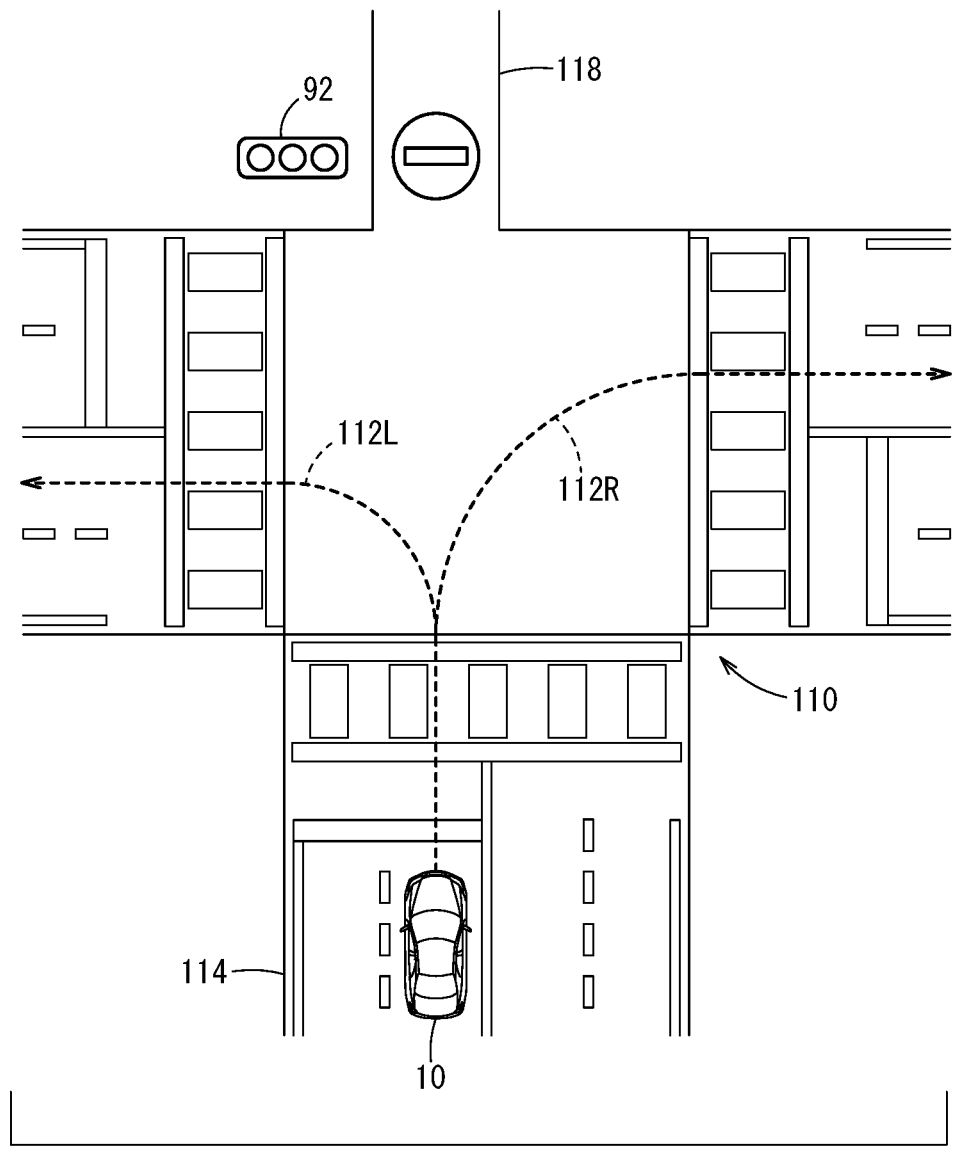
FIG. 6 is an illustration for describing vehicle situation at an intersection.

Using FIG. 4, an intersection 80 including a planned travel route with the predetermined curvature 1/rth or greater is described. At the intersection 80, a planned travel route 82R is set along an outgoing road 86 in the right-turn direction from an incoming road 84, or a planned travel route 82L is set along an outgoing road 88 in the left-turn direction from the incoming road 84, or a planned travel route 82S is set along an outgoing road 90 extending forward from the incoming road 84. The curvature 1/r of the planned travel route 82R, 82L is equal to or greater than the predetermined curvature 1/rth. By contrast, the curvature 1/r of the planned travel route 82S is less than the predetermined curvature 1/rth. The curvature 1/r of planned travel route 102R, 102L at an intersection 100 shown in FIG. 5 and that of planned travel route 112R, 112L at an intersection 110 shown in FIG. 6 are also equal to or greater than the predetermined curvature 1/rth, as with the planned travel route 82R, 82L.

Figure 7A:
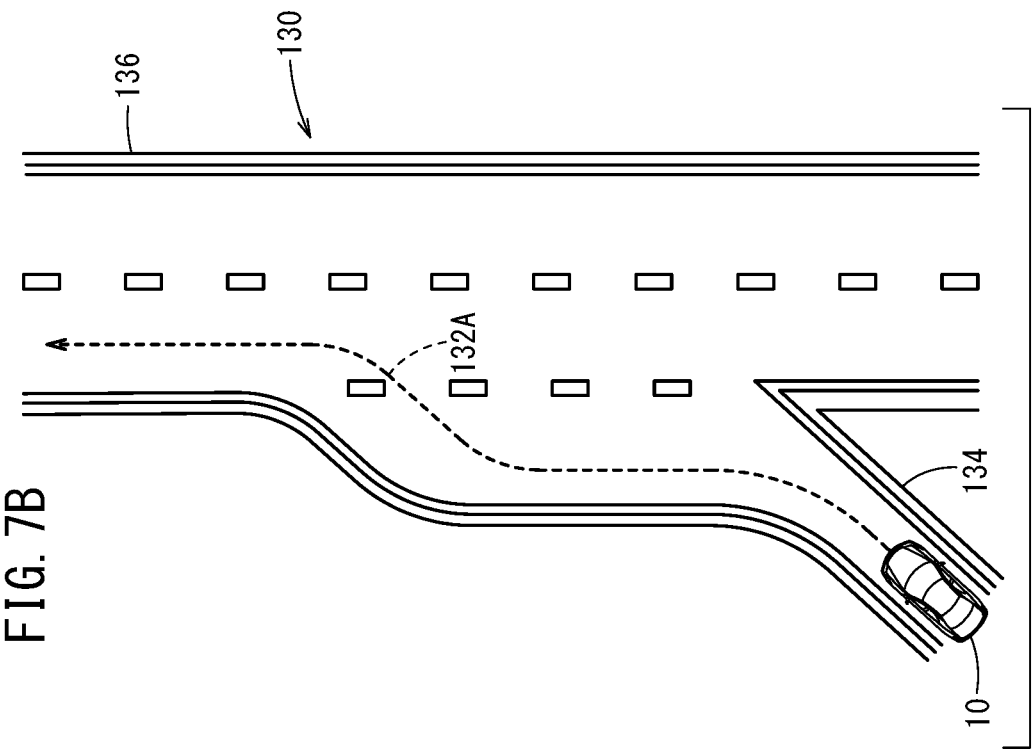
FIGS. 7A and 7B are illustrations for describing vehicle situation at a merging point.
Figure 7B:
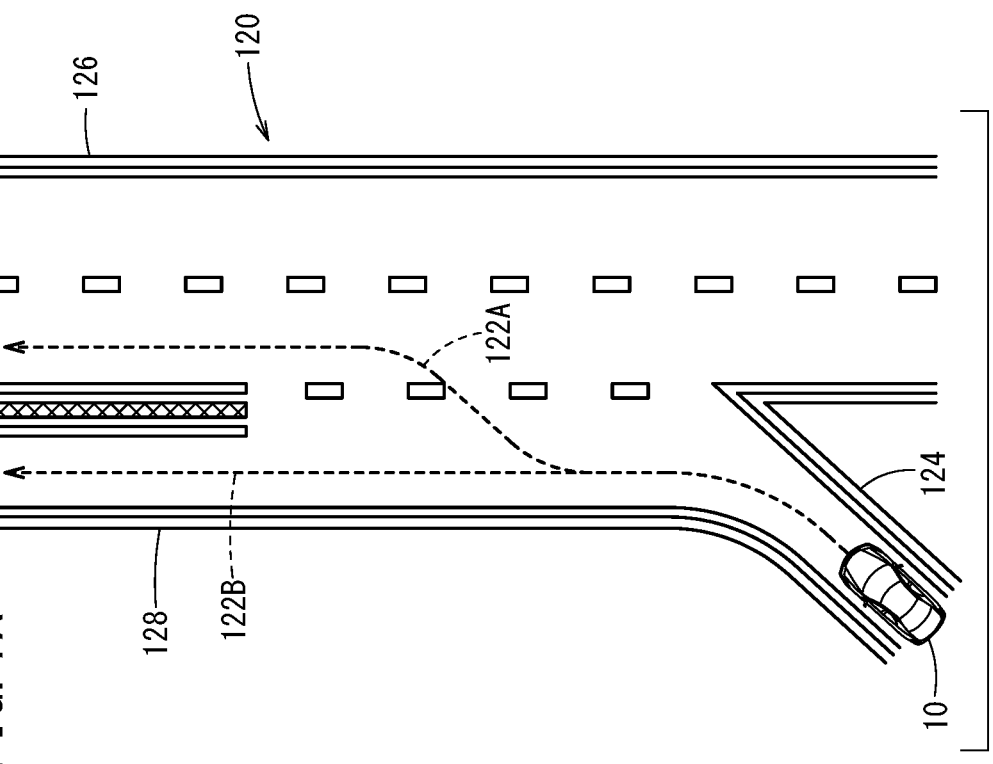

Using FIGS. 7A and 7B, merging points 120, 130 including a planned travel route with the predetermined curvature 1/rth or greater is described. At the merging point 120, a planned travel route 122A is set along a main road 126, which requires a course change from an incoming road 124, or a planned travel route 122B is set along a frontage road 128 extending forward from the incoming road 124. The curvature 1/r of the planned travel route 122A is equal to or greater than the predetermined curvature 1/rth. By contrast, the curvature 1/r of the planned travel route 122B is less than the predetermined curvature 1/rth. The curvature 1/r of a planned travel route 132A at a merging point 130 shown in FIG. 7B is also equal to or greater than the predetermined curvature 1/rth as with the planned travel route 122A.

Figure 8:
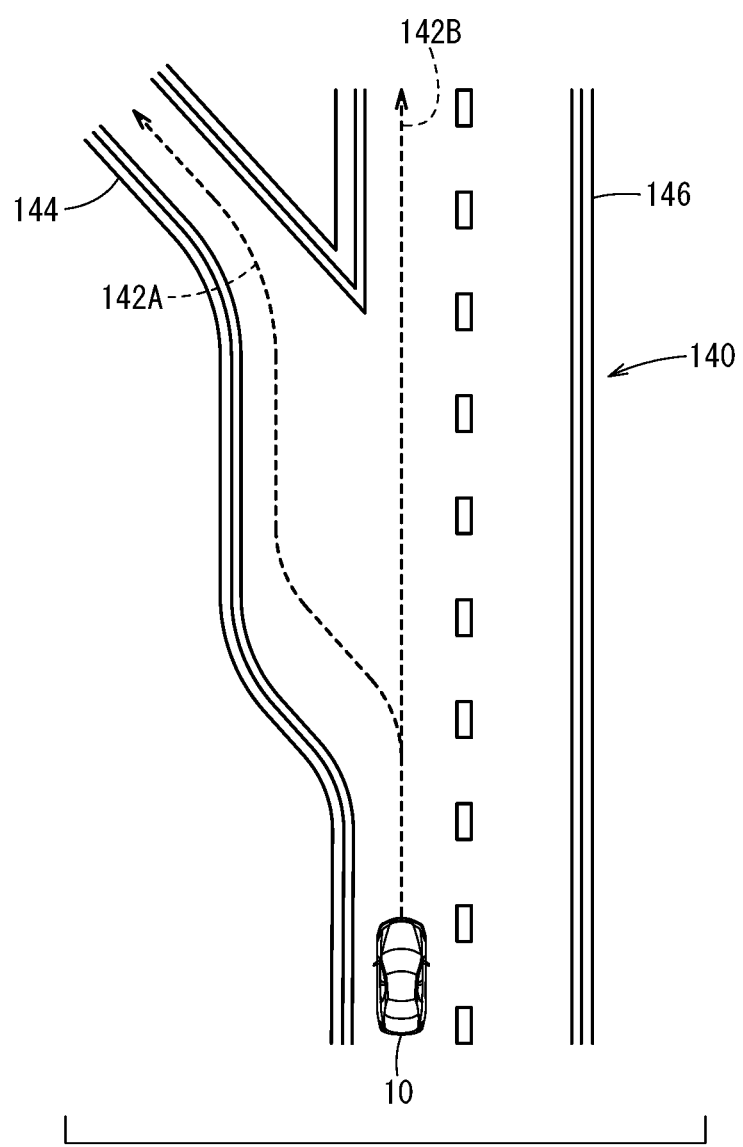
FIG. 8 is an illustration for describing vehicle situation at a branching point.

Using FIG. 8, a branching point 140 including a planned travel route with the predetermined curvature 1/rth or greater is described. At the branching point 140, a planned travel route 142A is set along an outgoing road 144, which requires a course change from a main road 146, or a planned travel route 142B is set along the main road 146. The curvature 1/r of the planned travel route 142A is equal to or greater than the predetermined curvature 1/rth. By contrast, the curvature 1/r of the planned travel route 142B is less than the predetermined curvature 1/rth.

Figure 9B:
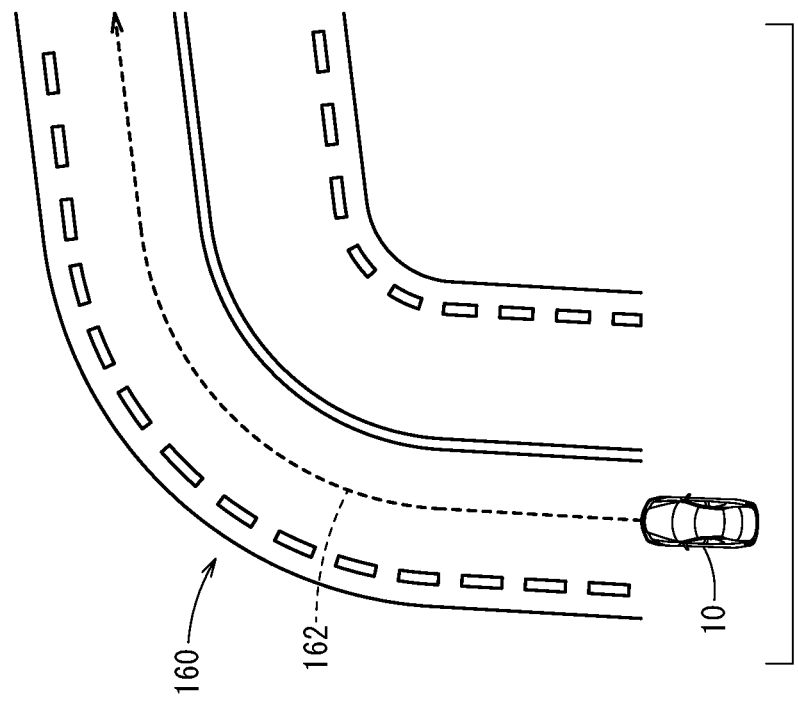
FIGS. 9A and 9B are illustrations for describing vehicle situation at a curve.
Figure 9A:
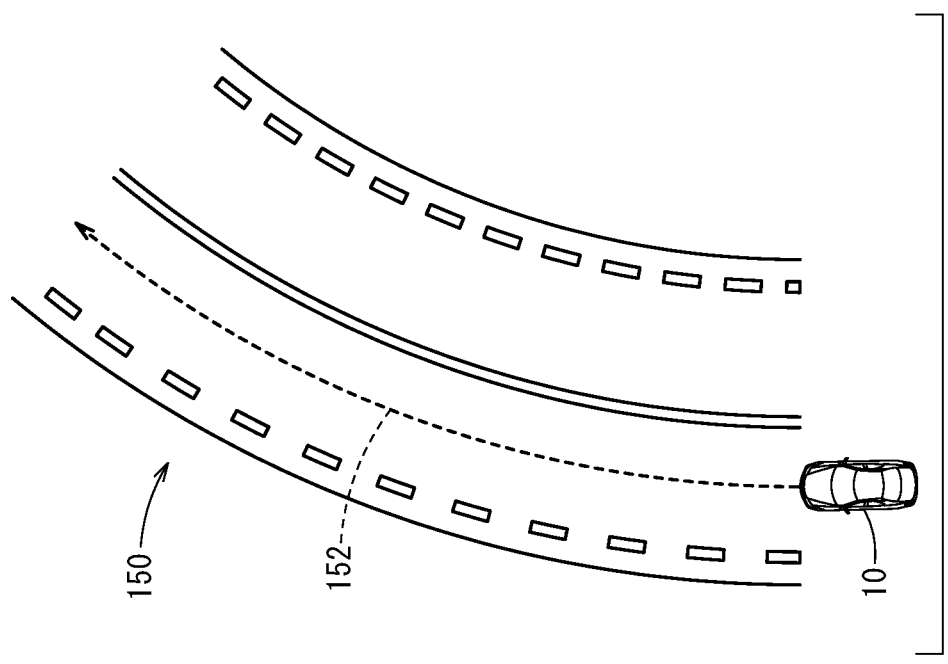

As shown in FIG. 9A, a gentle curve 150 is included in the planned travel route and a planned travel route 152 is set along the curve 150. The curvature 1/r of the planned travel route 152 is less than predetermined curvature 1/rth. By contrast, as shown in FIG. 9B, a steep curve 160 is included in the planned travel route and a planned travel route 162 is set along the curve 160. The curvature 1/r of the planned travel route 162 is equal to or greater than the predetermined curvature 1/rth.

Referring back to FIG. 2, the description is continued. At step S3, the current position of the vehicle 10 is recognized by the host vehicle recognition unit 48 and the planned travel route is recognized by the route recognition unit 62. The condition determination unit 70 grasps the geometry of the planned travel route within the first predetermined distance Dth1 from the current position of the vehicle 10 with the map information 40a stored in the navigation device 36. The condition determination unit 70 then determines if there is any point with the curvature 1/r equal to or greater than the predetermined curvature 1/rth. If there is a point with the curvature 1/r equal to or greater than the predetermined curvature 1/rth (step S3: YES), the process proceeds to step S4. For example, the process proceeds to step S4 when the planned travel route 82R, 82L shown in FIG. 4, the planned travel route 102R, 102L shown in FIG. 5, planned travel route 112R, 112L shown in FIG. 6, the planned travel route 122A shown in FIG. 7A, the planned travel route 132A shown in FIG. 7B, the planned travel route 142A shown in FIG. 8, or the planned travel route 162 shown in FIG. 9B has been set. On the other hand, if there is no point with the curvature 1/r equal to or greater than the predetermined curvature 1/rth (step S3: NO), the subsequent steps are not performed and the first request process ends once. For example, the first request process ends once when the planned travel route 82S shown in FIG. 4, the planned travel route 122B shown in FIG. 7A, the planned travel route 142B shown in FIG. 8, or the planned travel route 152 shown in FIG. 9A has been set. The predetermined curvature 1/rth may be set either to a fixed value or to different values for each point of travel (intersections where a right/left turn is planned, merging points, branching points, and curves). In the latter case, more accurate determination is possible. The first predetermined distance Dth1 is preset so that it agrees with the distance at which the navigation device 36 first gives guidance on change in the course or the direction of travel at a right/left turn point or the like to the vehicle occupants.

At step S4, one of the predetermined conditions holds. The condition that holds at this stage is a situation where a right/left turn point or the like is included in the planned travel route within the first predetermined distance Dth1 from the current position (the first condition). Here, the notification control unit 60 outputs a notification command for an H/O request to the notification device 26. The notification device 26 displays a screen prompting an H/O request and gives audio guidance on an H/O request.

At step S5, the automated driving control unit 58 determines whether an override has occurred or not. If an override has occurred (step S5: YES), the first request process ends once. Here, the automated driving control unit 58 once stops the automated driving. The notification device 26 dismisses the screen prompting an H/O request. On the other hand, if an override has not occurred (step S5: NO), the process proceeds to step S6.

At step S6, the deceleration selection unit 72 chooses not to decelerate the vehicle 10, that is, to travel at a constant velocity or higher (maintaining a constant velocity or higher). The vehicle control unit 52 outputs a control command to the driving force device 20 so as to make the vehicle 10 travel at a constant velocity or higher.

At step S7, the host vehicle recognition unit 48 compares the distance D from the current position of the vehicle 10 to the (node of) right/left turn point or the like with a second predetermined distance Dth2 (for example, 300 m). When D<Dth2 (step S7: YES), the process proceeds to step S8. On the other hand, when D≥Dth2 (step S7: NO), the process returns to step S5.

Turning to FIG. 3, the description on the first request process is continued. At step S8, the notification control unit 60 outputs a notification command for an H/O request to the notification device 26 again. The notification device 26, having been displaying a screen prompting an H/O request since step S4, gives audio guidance on H/O request again here.

At step S9, the condition determination unit 70 determines if there is a road extending forward at the right/left turn point or the like recognized at step S3. Here, whether there is a road or not is determined by imagining a curved route connecting the entrance of the node (the exit of the incoming road) and the exit (the entrance of the outgoing road) and seeing whether the curvature 1/r of that route is less than the predetermined curvature 1/rth or not. Alternatively, whether there is a road or not is determined based on whether the angle θ between the incoming road and the outgoing road is equal to or greater than the predetermined angle θth or not. For example, at the intersection 80 shown in FIG. 4, the outgoing road 90 extending forward seen from the incoming road 84 is present. The vehicle 10 is able to enter the outgoing road 90. By contrast, at the intersection 100 shown in FIG. 5, there is no road extending forward seen from an incoming road 104. At the intersection 110 shown in FIG. 6, there is a road 118 forward seen from an incoming road 114 but this road 118 is a no-entry road. Thus, it is assumed that there is no road forward seen from the incoming road 114. At the merging point 120 shown in FIG. 7A, the frontage road 128 extending forward seen from the incoming road 124 is present. The vehicle 10 is able to enter the frontage road 128. By contrast, at the merging point 130 shown in FIG. 7B, there is no road extending forward seen from a merging road 134. At the branching point 140 shown in FIG. 8, there is a road extending forward (the main road 146) seen from the main road 146. For the curve 150 shown in FIG. 9A, it is assumed that there is a road extending forward because the curvature 1/r of the curve 150 is less than the predetermined curvature 1/rth. By contrast, for the curve 160 shown in FIG. 9B, it is assumed that there is no road extending forward because the curvature 1/r of the curve 160 is equal to or greater than the predetermined curvature 1/rth. If there is a road extending forward at the right/left turn point or the like in step S9 (step S9: YES), the process proceeds to step S10. On the other hand, if there is no road extending forward at the right/left turn point or the like (step S9: NO), the process proceeds to step S13.

At step S10, the condition determination unit 70 determines whether there is a traffic light 92 (see FIG. 4, for instance) at the right/left turn point or the like recognized at step S3. The presence or absence of the traffic light 92 has been recognized by the traffic light recognition unit 64, and the determination is based on the result of recognition. If there is a traffic light 92 at the right/left turn point or the like (step S10: YES), the process proceeds to step S11. On the other hand, if there is no traffic light 92 at the right/left turn point or the like (step S10: NO), the process proceeds to step S14.

At step S11, the signal prediction unit 54 predicts the signal of the traffic light 92 at a time when the vehicle 10 reaches the location of the traffic light 92. At step S12, the condition determination unit 70 determines the type of the signal predicted by the signal prediction unit 54. If the type of the signal is a progress permitting signal (step S12: progress permitted), the process proceeds to step S14. On the other hand, if the type of the signal is a stop commanding signal (or a warning signal) (step S12: a stop commanded), the process proceeds to step S13.

When proceeding to step S13 from step S9 or step S12, a deceleration process is performed. The deceleration process is described below in [3-1-1].

At step S14, the automated driving control unit 58 determines whether an override has occurred or not. If an override has occurred (step S14: YES), the first request process ends once. Here, the automated driving control unit 58 once stops the automated driving. The notification device 26 dismisses the screen prompting an H/O request. On the other hand, if an override has not occurred (step S14: NO), the process proceeds to step S15.

At step S15, only the first condition holds among the predetermined conditions. In that case, the deceleration selection unit 72 chooses not to decelerate the vehicle 10, that is, to travel at a constant velocity or higher (maintaining a constant velocity or higher). The vehicle control unit 52 outputs a control command to the driving force device 20 so as to make the vehicle 10 travel at a constant velocity or higher.

At step S16, the host vehicle recognition unit 48 compares the distance D from the current position of the vehicle 10 to (the node of) the right or left turn point or the like with a third predetermined distance Dth3 (for example, 100 m). When D<Dth3 (step S16: YES), that is, when the distance D between the current position of the vehicle 10 and the right/left turn point or the like is short, the process proceeds to step S17. On the other hand, when D≥Dth3 (step S16: NO), that is, when the distance D between the current position of the vehicle 10 and the right/left turn point or the like is relatively long, the process returns to step S14.

At step S17, the trajectory generation unit 50 changes the planned travel route (a right or left turn, merging point, or branching route) at the right/left turn point or the like to a route that extends forward from the right/left turn point or the like, that is, a route along the road. The vehicle control unit 52 outputs a control command to the driving force device 20 so as to make the vehicle 10 travel at a constant velocity or higher following the changed route. Here, the notification device 26 keeps displaying a screen prompting an H/O request.

At step S18, a rerouting process is performed. The rerouting process is described below in [3-1-2].

3-1-1 Deceleration Process

Figure 10:
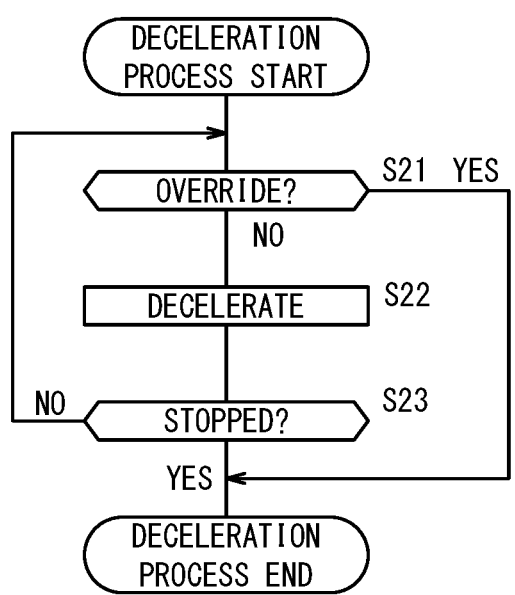
FIG. 10 is a flowchart of a deceleration process.

Using the flowchart shown in FIG. 10, the deceleration process performed at step S13 in FIG. 3 is described.

At step S21, the automated driving control unit 58 determines whether an override has occurred or not. If an override has occurred (step S21: YES), the deceleration process ends. Here, the automated driving control unit 58 once stops the automated driving. On the other hand, if an override has not occurred (step S21: NO), the process proceeds to step S22.

At step S22, among the predetermined conditions, the first condition and either the second or third condition hold. In that case, the deceleration selection unit 72 chooses to decelerate the vehicle 10. The vehicle control unit 52 outputs a control command to the driving force device 20 so as to decelerate the vehicle 10.

At step S23, the host vehicle recognition unit 48 determines whether the vehicle 10 has stopped or not. For example, it is determined that the vehicle 10 has stopped if the vehicle velocity V detected by the vehicle velocity sensor of the vehicle sensor 14 has become 0. If the vehicle 10 has stopped (step S23: YES), the deceleration process ends. On the other hand, if the vehicle 10 has not stopped (step S23: NO), the process returns to step S21.

3-1-2 Rerouting Process

Figure 11:
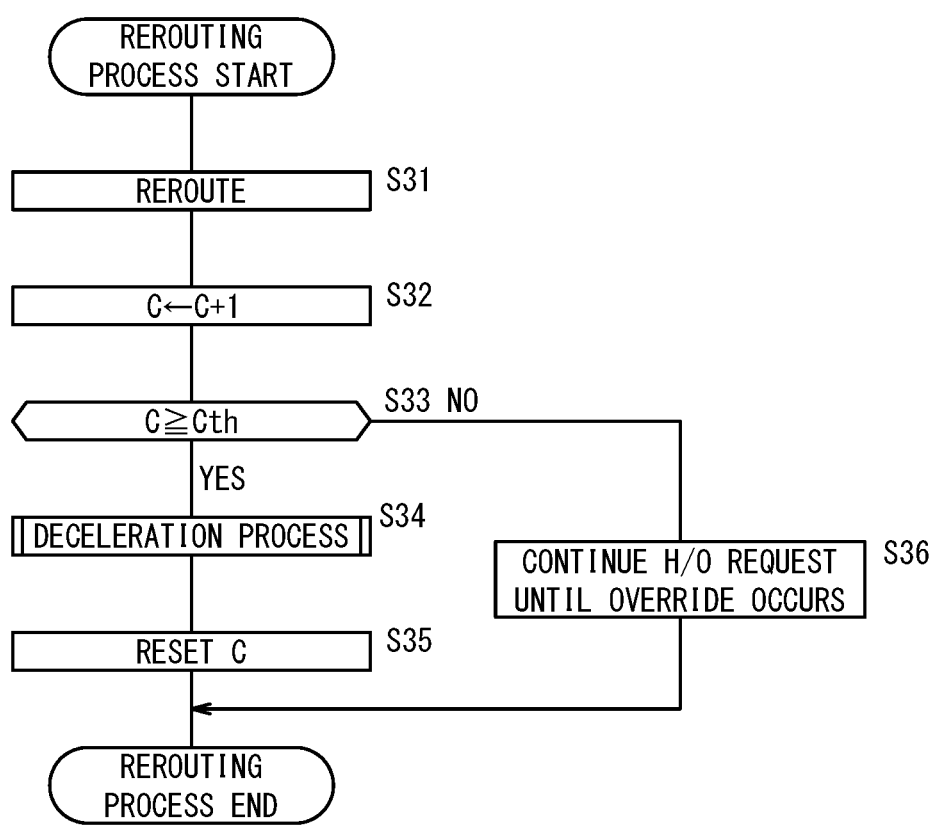
FIG. 11 is a flowchart of a rerouting process.

Using the flowchart shown in FIG. 11, the rerouting process performed at step S18 in FIG. 3 is described. A counter C used in the subsequent steps is reset at the time of powering-on and overriding of the vehicle 10.

At step S31, the navigation device 36 performs rerouting. At step S17 in FIG. 3, the vehicle 10 passed forward through a planned right/left turn point, a planned merging point, or a planned branching point that was included in the original planned travel route. Thus, the navigation device 36 reroutes the planned travel route from the current position of the vehicle 10 to the destination.

At step S32, the counter C is incremented by 1. At step S33, the automated driving control unit 58 compares the counter C with a rerouting count threshold Cth. When C≥Cth (step S33: YES), the process proceeds to step S34. On the other hand, when C<Cth (step S33: NO), the process proceeds to step S36.

At step S34, a deceleration process is performed. When rerouting is repeatedly performed the rerouting count threshold Cth or more, the driver can be in a situation where driving is difficult. Thus, the vehicle 10 is forced to decelerate here. The deceleration process is described above in [3-1-1]. Note that the conditions that hold at the point of step S22 shown in FIG. 10 are the first and sixth conditions.

At step S35, the counter C is reset and the rerouting process ends. In the case of proceeding to step S36 from step S33, an H/O request is continued and the rerouting process ends. In the case of proceeding to step S36, the H/O request is continued until an override occurs even after the rerouting process ends.

3-2 Second Request Process

Figure 12:
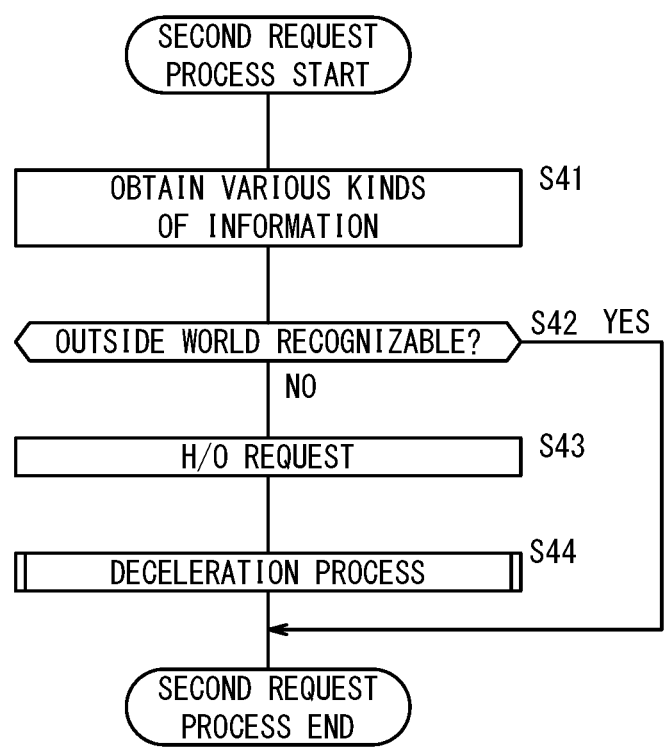
FIG. 12 is a flowchart of a second request process.

Using the flowchart shown in FIG. 12, the second request process is described. At step S41, the vehicle control apparatus 18 obtains information detected by the instruments in the outside information acquisition device 12 and the instruments in the vehicle sensor 14. At step S42, the condition determination unit 70 determines whether the outside world recognition unit 46 can recognize a part or the whole of the outside world. For example, when the road surface recognition unit 68 cannot recognize lane markings on the road surface, it is determined that a part or the whole of the outside world cannot be recognized. It is also determined that a part or the whole of the outside world cannot be recognized when a target object can be recognized by one sensor but the same target object cannot be recognized by other sensors, for example, when a vehicle ahead cannot be detected by the radars 32 and the LIDARs 34 even though the vehicle ahead can be detected by the cameras 30. When the outside world recognition unit 46 can recognize a part or the whole of the outside world (step S42: YES), the second request process ends. On the other hand, when it cannot recognize a part or the whole of the outside world (step S42: NO), the process proceeds to step S43.

At step S43, one of the predetermined conditions holds. The condition that holds at this stage is a situation where a part or the whole of the outside world cannot be recognized (the fourth condition). Here, the notification control unit 60 outputs a notification command for an H/O request to the notification device 26. The notification device 26 displays a screen prompting an H/O request and gives audio guidance on an H/O request.

At step S44, a deceleration process is performed. The deceleration process is described above in [3-1-1]. Note that the condition that holds at the point of step S22 shown in FIG. 10 is the fourth condition.

3-3 Third Request Process

Figure 13:
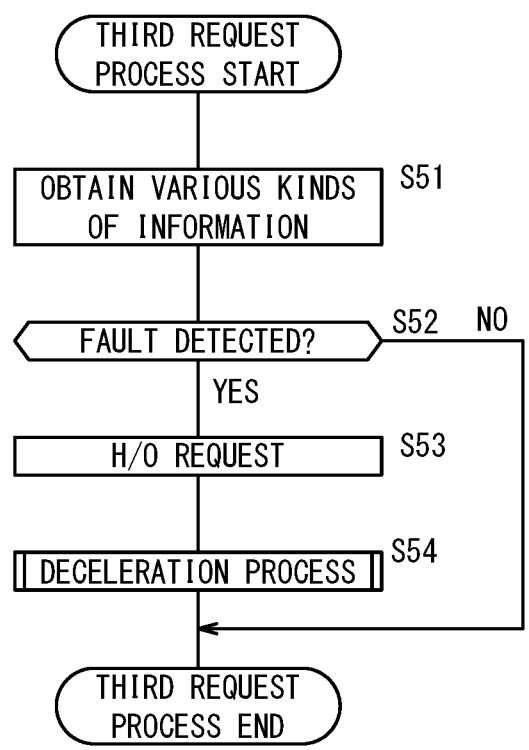
FIG. 13 is a flowchart of a third request process.

Using the flowchart shown in FIG. 13, the third request process is described. At step S51, the vehicle control apparatus 18 obtains information detected by the instruments included in the outside information acquisition device 12 and the vehicle sensor 14 and also obtains fault information for the instruments as detected by the ECUs included in the driving force device 20, the steering device 22, the braking device 24, and the notification device 26. At step S52, the condition determination unit 70 determines whether any fault in the instruments included in the outside information acquisition device 12, the vehicle sensor 14, the driving force device 20, the steering device 22, the braking device 24, the notification device 26, and the like is detected by the fault detection unit 56 or not. If no fault is detected (step S52: NO), the third request process ends. On the other hand, if a fault is detected (step S52: YES), the process proceeds to step S53.

At step S53, one of the predetermined conditions holds. The condition that holds at this stage is a situation where a fault in any of the instruments included in the outside information acquisition device 12 and the vehicle sensor 14 is detected (the fifth condition). Here, the notification control unit 60 outputs a notification command for an H/O request to the notification device 26. The notification device 26 displays a screen prompting an H/O request and gives audio guidance on an H/O request.

At step S54, a deceleration process is performed. The deceleration process is described above in [3-1-1]. Note that the condition that holds at the point of step S22 shown in FIG. 10 is the fifth condition.

4 Others

As mentioned above, the first to third request processes are performed in parallel and inter-vehicle distance maintenance control is also performed in parallel. Then, when the inter-vehicle distance between the vehicle 10 and the vehicle ahead has become equal to or less than a distance appropriate for the vehicle velocity V, inter-vehicle distance maintenance control (deceleration control) is executed preferentially.

Further, as shown in FIG. 4, deceleration and stop of the vehicle 10 are prioritized if traffic participants (a pedestrian H, bicycles, animals, and the like) that are crossing or are to cross a crosswalk 96 are recognized when the vehicle 10 is entering the outgoing road 90 from the incoming road 84 by traveling along the road. Also, deceleration and stop of the vehicle 10 are prioritized when there is a stop sign. The vehicle 10 is then stopped at the stop line 94. When a rail crossing is present, the vehicle 10 is stopped before the rail crossing.

The first request process shown in FIGS. 2 and 3 assumes a scene where a destination is set on the navigation device 36 and a planned travel route from the current position of the vehicle 10 to the destination is set. The present invention is also applicable to automated driving in which forward travel along the road is set instead of setting a destination. When travel along the road is set, the rerouting process (step S18) in the process shown in FIG. 3 will not be performed.

5 Gist of the Embodiment

This embodiment relates to a vehicle control apparatus 18 that makes a vehicle 10 travel by automated driving and demands manual driving of a driver when at least one of one or more predetermined conditions holds. The vehicle control apparatus 18 includes: a condition determination unit 70 configured to determine whether any of the predetermined conditions holds or not; and a deceleration selection unit 72 configured to select whether to decelerate the vehicle 10 or not at a time of demanding manual driving based on one or more of the predetermined conditions that hold. In this embodiment, the velocity can be appropriately controlled at the time of demanding manual driving of the driver in accordance with the cause of the demand for manual driving.

The vehicle control apparatus 18 includes: a route recognition unit 62 configured to recognize a planned travel route of the vehicle 10; and a host vehicle recognition unit 48 configured to recognize a current position of the vehicle 10. The condition determination unit 70 is configured to determine that at least one of the predetermined conditions holds when a right/left turn point or the like is included in the planned travel route within a predetermined distance from the current position. The deceleration selection unit 72 is configured to select not to decelerate the vehicle 10 when a right/left turn point or the like is included in the planned travel route within the predetermined distance from the current position. It is difficult to continue automated driving at a right/left turn point or the like. Thus, the driving should be taken over to the driver when the vehicle is expected to travel through a right/left turn point or the like during automated driving. It is possible, however, that the driver does not take over the driving intentionally or out of necessity. In such a case, if a road that can be traveled is present ahead of the right/left turn point or the like, the vehicle may continue to travel forward through the right/left turn point or the like and be subsequently rerouted. This embodiment allows the vehicle 10 to pass through without deceleration when the vehicle 10 continues to travel forward through a right/left turn point or the like without changing the course or direction of travel there. This can prevent stagnation of a traffic flow due to deceleration of the vehicle 10.

The vehicle control apparatus 18 includes: the route recognition unit 62 configured to recognize a planned travel route of the vehicle 10; and the host vehicle recognition unit 48 configured to recognize a current position of the vehicle 10. The condition determination unit 70 is configured to determine that at least one of the predetermined conditions holds when there is no road extending forward on the planned travel route within a predetermined distance from the current position. The deceleration selection unit 72 is configured to select to decelerate the vehicle 10 when there is no road extending forward on the planned travel route within the predetermined distance from the current position. In this embodiment, the vehicle 10 is decelerated beforehand in a scene that would require stopping of the vehicle 10 if the driver will not take over the driving. Thus, the vehicle 10 can be stopped promptly even if the driver does not take over the driving.

The vehicle control apparatus 18 includes: the route recognition unit 62 configured to recognize a planned travel route of the vehicle 10; the host vehicle recognition unit 48 configured to recognize a current position of the vehicle 10; and a signal prediction unit 54 configured to predict a signal of a traffic light 92 on the planned travel route at a time when the vehicle 10 traveling by automated driving reaches the traffic light 92. The condition determination unit 70 is configured to determine that at least one of the predetermined conditions holds when a right/left turn point or the like is included in the planned travel route within a predetermined distance from the current position and when a stop commanding signal is predicted for the traffic light 92 at the right/left turn point or the like by the signal prediction unit 54. The deceleration selection unit 72 is configured to select to decelerate the vehicle 10 when a right/left turn point or the like is included in the planned travel route within the predetermined distance from the current position and when a stop commanding signal is predicted for the traffic light 92 at the right/left turn point or the like by the signal prediction unit 54. In this embodiment, the vehicle 10 is decelerated beforehand in a scene that would require stopping of the vehicle 10 if the driver will not take over the driving. Thus, the vehicle 10 can be stopped promptly even if the driver does not take over the driving.

The vehicle control apparatus 18 includes an outside world recognition unit 46 configured to recognize an outside world. The condition determination unit 70 is configured to determine that at least one of the predetermined conditions holds when the outside world recognition unit 46 is unable to recognize a part or a whole of the outside world. The deceleration selection unit 72 is configured to select to decelerate the vehicle 10 when the outside world recognition unit 46 is unable to recognize a part or a whole of the outside world. In this embodiment, the vehicle 10 is decelerated beforehand in a scene that would require stopping of the vehicle 10 if the driver will not take over the driving. Thus, the vehicle 10 can be stopped promptly even if the driver does not take over the driving.

The vehicle control apparatus 18 includes a fault detection unit 56 configured to detect a fault in an instrument used in automated driving. The condition determination unit 70 is configured to determine that at least one of the predetermined conditions holds when a fault in the instrument is detected by the fault detection unit 56. The deceleration selection unit 72 is configured to select to decelerate the vehicle 10 when a fault in the instrument is detected by the fault detection unit 56. In this embodiment, the vehicle 10 is decelerated beforehand in a scene that would require stopping of the vehicle 10 if the driver will not take over the driving. Thus, the vehicle 10 can be stopped promptly even if the driver does not take over the driving.

This embodiment is also a vehicle control apparatus 18 that decelerates a vehicle at the time of demanding manual driving of a driver during automated driving. Then, the vehicle 10 is not decelerated in a case of demanding manual driving of the driver when a right or left turn is made at an intersection. This embodiment allows the vehicle 10 to pass through without deceleration when the vehicle 10 continues to travel forward through an intersection at which it has been planned to make a right or left turn. This can prevent stagnation of a traffic flow due to deceleration of the vehicle 10.

The invention claimed is:

1. A vehicle control apparatus that makes a vehicle travel by automated driving and demands manual driving of a driver when at least one of one or more predetermined conditions holds, the vehicle control apparatus comprising:
    a condition determination unit configured to determine whether any of the predetermined conditions holds or not;
    a route recognition unit configured to recognize a planned travel route of the vehicle;
    a host vehicle recognition unit configured to recognize a current position of the vehicle;
    a vehicle control unit configured to control traveling of the vehicle;
    a counter configured to count a number of times rerouting of the planned travel route is performed; and
    an automated driving control unit configured to compare a threshold with the number of times rerouting of the planned travel route is performed,
    wherein the predetermined conditions include a route condition that there is a point that requires predetermined or greater steering on the planned travel route within a predetermined distance from the current position, and
    wherein in a case that manual driving is not performed in response to a demand made on a basis that the route condition holds and the route recognition unit recognizes a route along a road without a point that requires predetermined or greater steering, the vehicle control unit controls the vehicle to travel on the route along the road when the number of times rerouting of the planned travel route is performed by the automated driving control unit is less than the threshold.

2. The vehicle control apparatus according to claim 1, comprising:
    a deceleration selection unit configured to select whether to decelerate the vehicle or not, wherein
    the deceleration selection unit selects deceleration of the vehicle if the number of times rerouting of the planned travel route is performed has reached or exceeded the threshold.

3. The vehicle control apparatus according to claim 2,
    wherein the condition determination unit is configured to determine that at least one of the predetermined conditions holds when there is no road extending forward on the planned travel route within a predetermined distance from the current position, and
    the deceleration selection unit is configured to select to decelerate the vehicle when there is no road extending forward on the planned travel route within the predetermined distance from the current position.

4. The vehicle control apparatus according to claim 2, comprising:
- a signal prediction unit configured to predict a signal of a traffic light on the planned travel route at a time when the vehicle traveling by automated driving reaches the traffic light,
- wherein the condition determination unit is configured to determine that at least one of the predetermined conditions holds when a node that involves a course change or a change in a direction of travel is included in the planned travel route within a predetermined distance from the current position and when a stop commanding signal is predicted for the traffic light at the node by the signal prediction unit, and
- the deceleration selection unit is configured to select to decelerate the vehicle when the node is included in the planned travel route within the predetermined distance from the current position and when a stop commanding signal is predicted for the traffic light at the node by the signal prediction unit.

5. The vehicle control apparatus according to claim 2, wherein the condition determination unit is configured to determine that at least one of the predetermined conditions holds when there is no road extending forward on the planned travel route within the predetermined distance from the current position, and
- the deceleration selection unit is configured to select to decelerate the vehicle when there is no road extending forward on the planned travel route within the predetermined distance from the current position.

6. The vehicle control apparatus according to claim 2, comprising:
- a signal prediction unit configured to predict a signal of a traffic light on the planned travel route at a time when the vehicle traveling by automated driving reaches the traffic light,
- wherein the condition determination unit is configured to determine that at least one of the predetermined conditions holds when the node is included in the planned travel route within the predetermined distance from the current position and when a stop commanding signal is predicted for the traffic light at the node by the signal prediction unit, and
- the deceleration selection unit is configured to select to decelerate the vehicle when the node is included in the planned travel route within the predetermined distance from the current position and when a stop commanding signal is predicted for the traffic light at the node by the signal prediction unit.

7. The vehicle control apparatus according to claim 2, comprising at least one of:
- an outside world recognition unit configured to recognize an outside world; and
- a fault detection unit configured to detect a fault in an instrument used in automated driving, wherein
- the condition determination unit is configured to determine that at least one of the predetermined conditions holds when the outside world recognition unit is unable to recognize a part or a whole of the outside world, and/or when the fault in the instrument is detected by the fault detection unit, and
- the deceleration selection unit is configured to select to decelerate the vehicle when the outside world recognition unit is unable to recognize a part or a whole of the outside world, and/or when a fault in the instrument is detected by the fault detection unit.

8. The vehicle control apparatus according to claim 1, wherein the counter is reset when manual driving is performed in response to the demand.

* * * * *